(12) United States Patent
Schmidt et al.

(10) Patent No.: US 7,926,866 B2
(45) Date of Patent: Apr. 19, 2011

(54) TRAILER ROOF HAVING IMPROVED SUPPORT STRUCTURE

(75) Inventors: George A. Schmidt, Langhorne, PA (US); James J. Jackson, Leo, IN (US)

(73) Assignee: Strick Corporation, Monroe, IN (US)

( * ) Notice: Subject to any disclaimer, the term of this patent is extended or adjusted under 35 U.S.C. 154(b) by 590 days.

(21) Appl. No.: 11/928,896

(22) Filed: Oct. 30, 2007

(65) Prior Publication Data
US 2008/0100077 A1    May 1, 2008

Related U.S. Application Data

(60) Provisional application No. 60/855,649, filed on Oct. 31, 2006.

(51) Int. Cl.
*B62D 33/023*    (2006.01)

(52) U.S. Cl. ............... 296/181.1; 296/181.3; 296/186.1

(58) Field of Classification Search ............... 296/181.1, 296/181.3, 182.1, 185.1, 186.1, 191, 210; *B60P 9/00; B62D 33/023*
See application file for complete search history.

(56) References Cited

U.S. PATENT DOCUMENTS

| | | | |
|---|---|---|---|
| 3,050,335 A | 10/1960 | Schubach | |
| 3,105,716 A * | 10/1963 | Learmont et al. | 296/182.1 |
| 3,391,445 A | 7/1968 | Miller | |
| 3,429,083 A * | 2/1969 | Voros | 52/53 |
| 3,962,015 A | 6/1976 | Heimann | |
| 4,089,558 A | 5/1978 | Banerjea et al. | |
| 4,214,789 A | 7/1980 | Katz et al. | |
| 4,685,721 A | 8/1987 | Banerjea | |
| 5,702,151 A | 12/1997 | Grote et al. | |
| 5,988,074 A * | 11/1999 | Thoman | 105/404 |
| 6,374,546 B1 * | 4/2002 | Fecko et al. | 52/17 |
| 6,502,895 B2 * | 1/2003 | Taylor | 296/178 |
| 7,100,972 B2 * | 9/2006 | Booher | 296/186.1 |
| 2003/0184120 A1 * | 10/2003 | Buchholz et al. | 296/181 |
| 2004/0217631 A1 * | 11/2004 | Ehrlich | 296/191 |
| 2005/0134086 A1 * | 6/2005 | Jones et al. | 296/186.1 |
| 2006/0043090 A1 * | 3/2006 | Ferrini | 220/6 |
| 2006/0158005 A1 * | 7/2006 | Brown | 296/186.1 |
| 2007/0132281 A1 | 6/2007 | Ehrlich | |
| 2007/0284912 A1 | 12/2007 | Klein | |

* cited by examiner

*Primary Examiner* — Glenn Dayoan
*Assistant Examiner* — SunSurraye Westbrook
(74) *Attorney, Agent, or Firm* — Taft, Stettinius & Hollister, LLP; Keith J. Swedo, Esq.

(57) ABSTRACT

A trailer includes a pair of vertical, spaced apart opposing sidewalls and a roof sheet extending between and mounted atop the sidewalls. The sidewalls and roof sheet cooperate to define a cargo space. The roof sheet has an interior surface facing the cargo space and an opposing exterior surface. A plurality of bows are mounted to the exterior surface of the roof sheet and extend between the sidewalls. The plurality of bows support the roof sheet. Each bow includes at least three contact portions attached to the exterior surface of the roof sheet. A rib portion interconnects the contact portions and defines a channel between the rib portion and the exterior surface of the roof sheet.

12 Claims, 6 Drawing Sheets

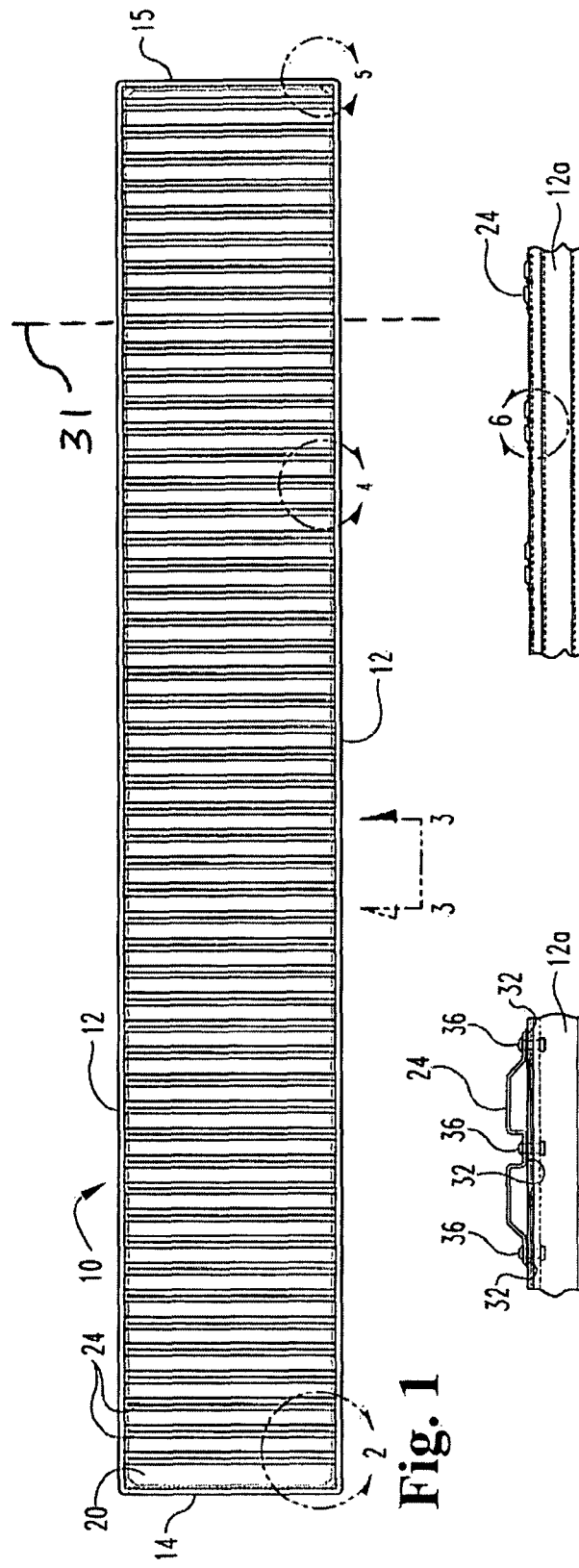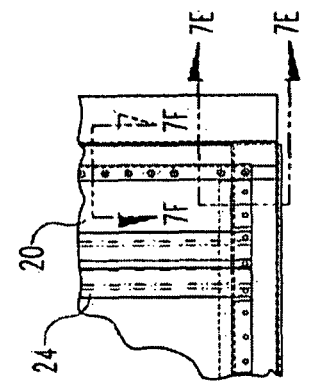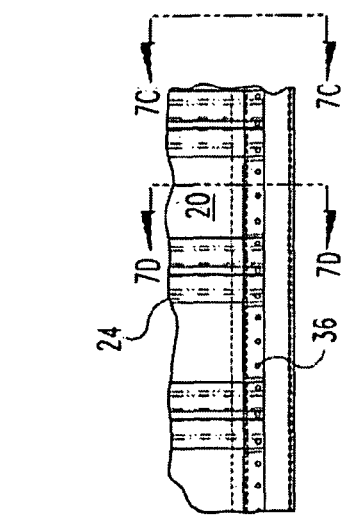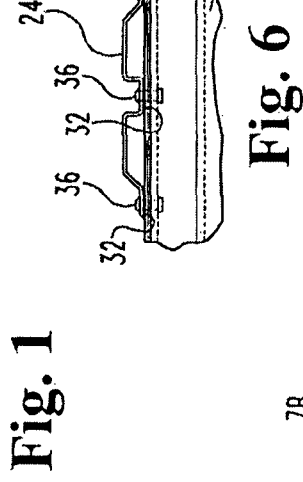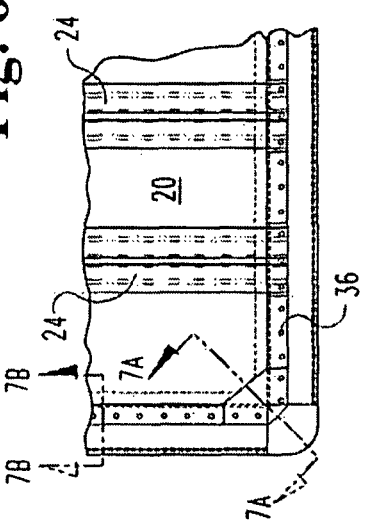

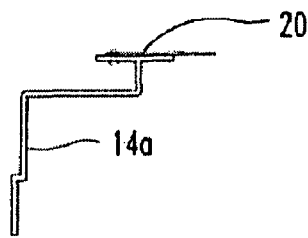
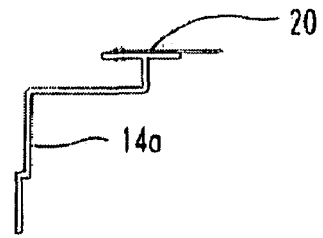
Fig. 7A     Fig. 7B
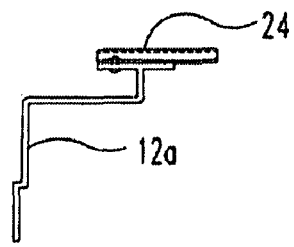
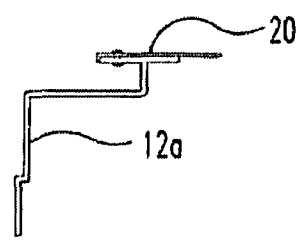
Fig. 7C     Fig. 7D
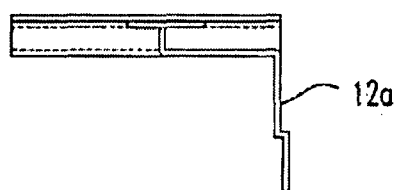
Fig. 7E     Fig. 7F
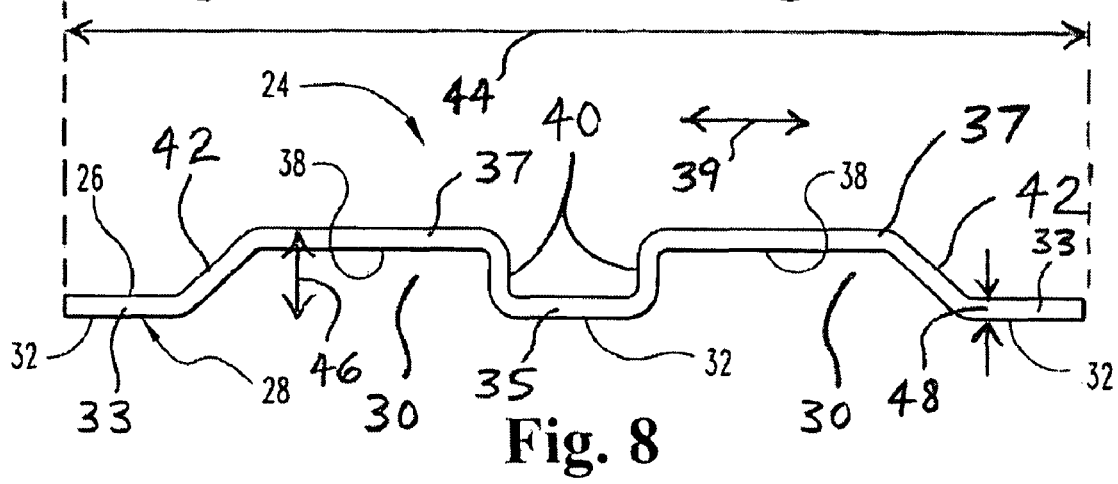
Fig. 8

TRAILER ROOF HAVING IMPROVED SUPPORT STRUCTURE

CROSS REFERENCE TO RELATED APPLICATION

This application claims benefit to U.S. Provisional Application Ser. No. 60/855,649, filed Oct. 31, 2006.

BACKGROUND

The present invention relates to trailers and transport vehicles and, more particularly, to the roof structure of such trailers or transport vehicles.

Transport vehicles, such as trailers, typically include a cargo space enclosed by a plurality of walls and a roof. Objects needing transport from one place to another are loaded into the cargo space and are protected from rain, snow, ice, dirt, road debris and other elements during transport by the roof and walls of the trailer. The roof of the trailer commonly includes a plurality of beams or bows, which are attached at their opposite ends to the tops of an opposing pair of the walls such that the beams extend between the opposing walls. A roof sheet is mounted atop the beams. The trailer also includes a door allowing access to the cargo space. Oftentimes, the objects needing to be transported are stacked on pallets in the cargo space. The stacked objects may be unloaded from the cargo space using a fork lift or other mechanical device which elevates the objects from the floor. As the objects are lifted from the floor and moved through the cargo space, the objects may hit the support beams of the roof, causing the stacked items to either become lodged in the cargo space or fall over, thereby making it difficult to unload the objects and, in some cases, causing damage to the objects.

SUMMARY

The present invention provides a trailer including a plurality of roof bows having opposite ends attached to respective side walls of the trailer. The roof bows have contact portions attached to the exterior of a roof panel such that the roof bows support the weight of the roof panel. The roof bows include rib portions that interconnect the contact portions and define respective channels between the rib portions and the exterior of the roof panel.

The invention comprises, in one form thereof, a trailer including a pair of vertical, spaced apart opposing sidewalls and a roof sheet extending between and mounted atop the sidewalls. The sidewalls and roof sheet cooperate to define a cargo space. The roof sheet has an interior surface facing the cargo space and an opposing exterior surface. A plurality of bows are mounted to the exterior surface of the roof sheet and extend between the sidewalls. The plurality of bows support the roof sheet. Each bow includes at least three contact portions attached to the exterior surface of the roof sheet. A rib portion interconnects the contact portions and defines a channel between the rib portion and the exterior surface of the roof sheet.

The invention comprises, in another form thereof, a trailer including a pair of spaced apart sidewalls. A roof assembly extends between and is mounted atop the sidewalls such that the sidewalls and the roof assembly conjointly define a cargo space. The roof assembly includes a roof sheet having an interior surface facing the cargo space and an opposing exterior surface. A plurality of elongate support beams are attached to the exterior surface of the roof sheet and extend between the sidewalls. Each beam includes at least two substantially flat contact portions attached to the exterior surface of the roof sheet. A rib portion interconnects first and second ones of the contact portions and defines a channel between the rib portion and the exterior surface of the roof sheet. The rib portion includes a first wall adjacent to the first contact portion and a second wall adjacent to the second contact portion. The first wall is oriented at an angle of approximately 90 degrees relative to the roof sheet.

The invention comprises, in yet another form thereof, a trailer including a pair of spaced apart sidewalls and a roof sheet extending between and mounted to the sidewalls. The sidewalls and roof sheet cooperate to define a cargo space. The roof sheet has an interior surface facing the cargo space and an opposing exterior surface. A plurality of elongate support beams are mounted to the exterior surface of the roof sheet and extend between the sidewalls. The beams support the roof sheet. Each beam includes first and second outer contact portions attached to the exterior surface of the roof sheet. The first and second outer contact portions are disposed on opposite sides of an axis defined by the beam. A first rib portion has a first outer wall attached to the first outer contact portion. The first outer wall is oriented at an angle of approximately between 30 and 60 degrees relative to the roof sheet. The first rib portion has a first inner wall connected to the first outer wall. The first inner wall is oriented at an angle of approximately between 60 and 90 degrees relative to the roof sheet. A second rib portion has a second outer wall attached to the second outer contact portion. The second outer wall is oriented at an angle of approximately between 30 and 60 degrees relative to the roof sheet. The second rib portion has a second inner wall connected to the second outer wall. The second inner wall is oriented at an angle of approximately between 60 and 90 degrees relative to the roof sheet. A central contact portion is attached to the exterior surface of the roof sheet. The central contact portion is disposed between the first inner wall and the second inner wall. At least two of the first and second outer contact portions and the central contact portion have contact surfaces that face the roof sheet and that are substantially co-planar.

An advantage of the present invention is that the transport vehicle or trailer provides a cargo space with reduced obstructions to the loading and unloading of cargo. Because the bows may be positioned on the exterior side of the roof sheet rather than in the interior cargo space, the bows may not obstruct the loading and unloading of cargo.

Another advantage is that the bow includes one or more ribs that provide the bow with structural strength to resist bending and to support more weight.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a top view of a roof of a trailer in accordance with one embodiment of the present invention;
FIG. 2 is an enlarged view of encircled region 2 of FIG. 1;
FIG. 3 is a side view taken along line 3-3 of FIG. 1;
FIG. 4 is an enlarged view of encircled region 4 of FIG. 1;
FIG. 5 is an enlarged view of encircled region 5 of FIG. 1;
FIG. 6 is an enlarged view of encircled region 6 of FIG. 3;
FIG. 7A is a sectional taken along line 7A-7A of FIG. 2;
FIG. 7B is a sectional taken along line 7B-7B of FIG. 2;
FIG. 7C is a sectional taken along line 7C-7C of FIG. 4;

FIG. 7D is a sectional taken along line 7D-7D of FIG. 4;
FIG. 7E is a sectional taken along line 7E-7E of FIG. 5;
FIG. 7F is a sectional taken along line 7F-7F of FIG. 5;
FIG. 8 is a sectional view of a bow of the roof of FIG. 1.

Figure 9:
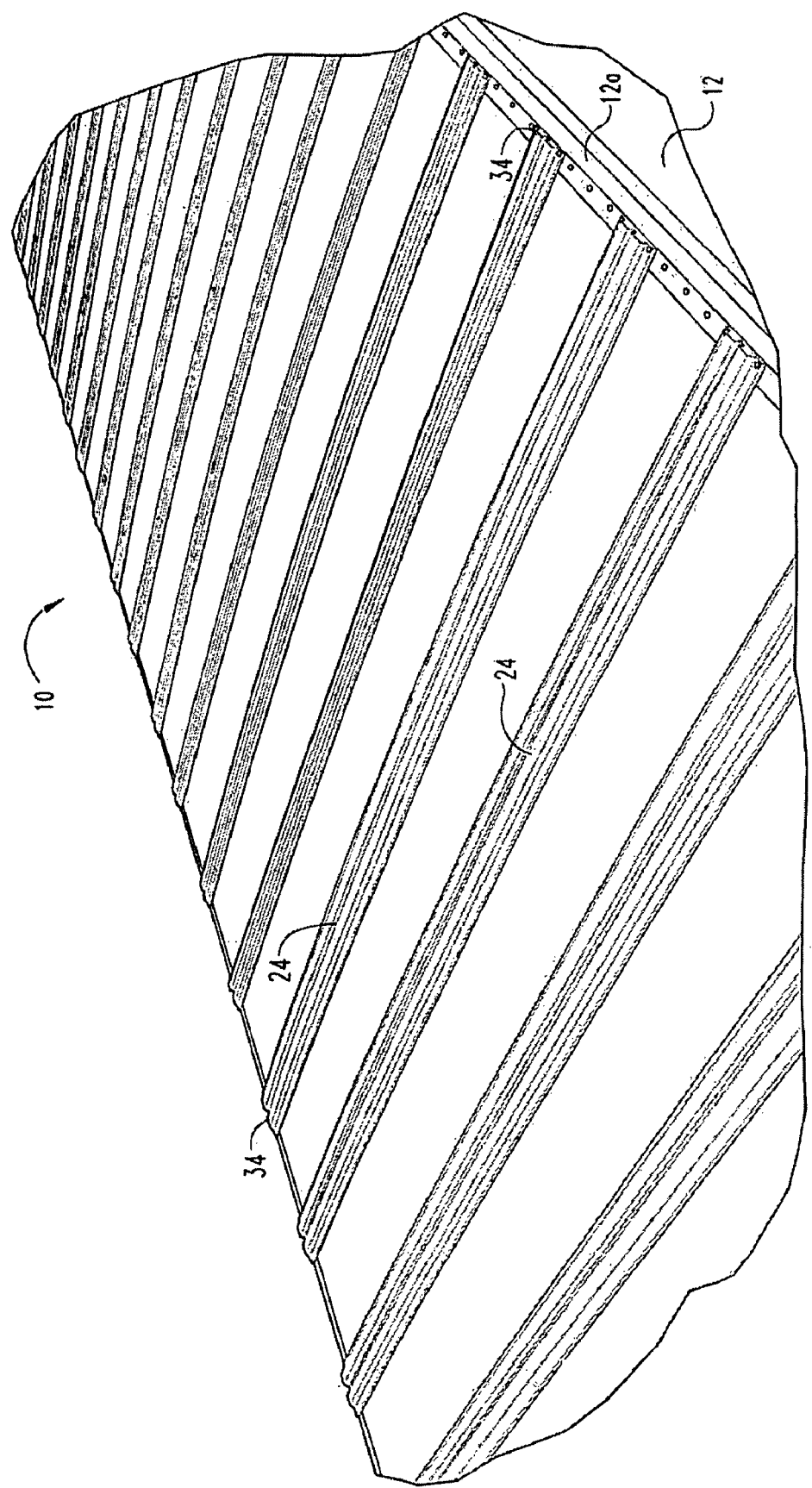
FIG. 9 is a top perspective view of a trailer having a roof in accordance with an embodiment of the present invention.
Figure 10:
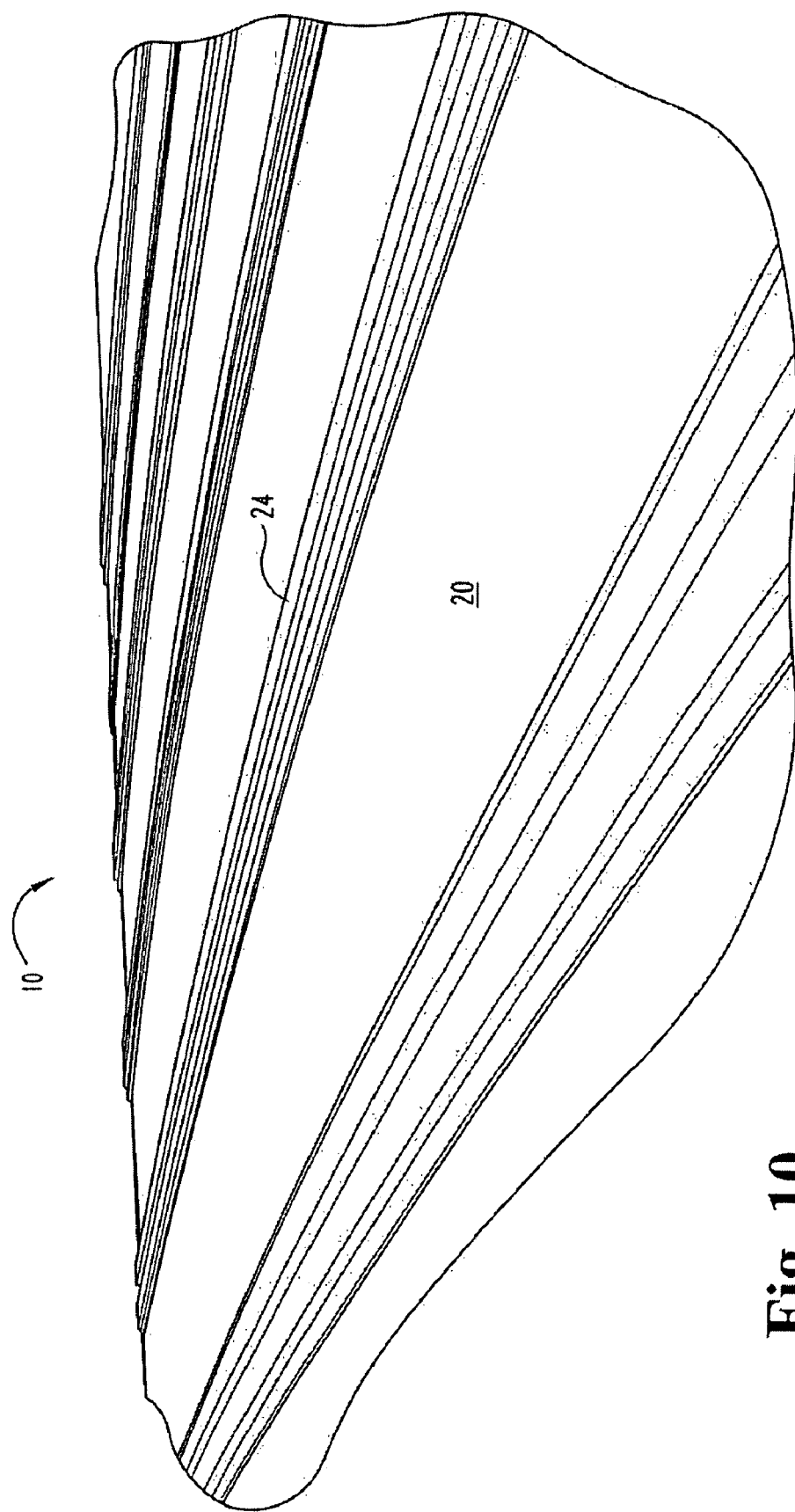
FIG. 10 is another top perspective view of the trailer of FIG. 9.
Figure 11:
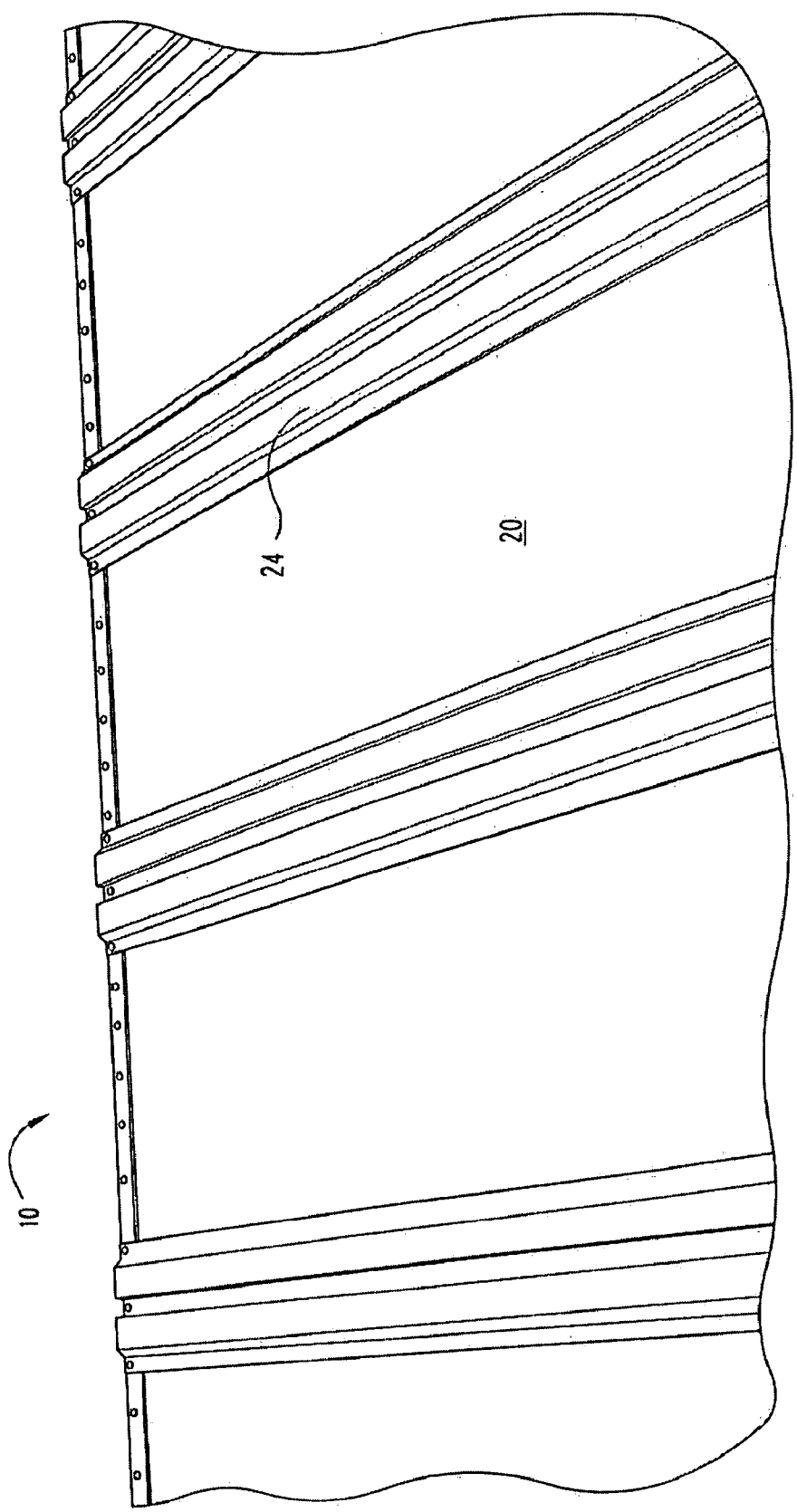
FIG. 11 is yet another top perspective view of the trailer of FIG. 9.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring to FIGS. 1 and 9-11, trailer 10 according to one embodiment of the present invention is illustrated. Trailer 10 generally includes front wall 14, opposing rear wall 15, opposing sidewalls 12 extending between front and rear walls 14, 15 and roof sheet 20 extending between sidewalls 12 and opposing front and rear walls 14, 15. Roof sheet 20, sidewalls 12, front wall 14 and rear wall 15 cooperate to enclose and form a cargo space (not shown) for receiving cargo. Roof sheet 20 has an interior surface facing the cargo space and an opposing exterior surface. As illustrated in FIGS. 3, 6, 7C-7E, and 9, sidewalls 12 include top side rail 12a extending along the top edge of sidewall 12. Front and rear walls 14, 15 also include top front rail 14a (FIGS. 7A and 7B) and a top rear rail (not shown) extending along the top edge of front and rear walls 14, 15, respectively. Roof sheet 20 may be supported about its perimeter by top side rail 12a, front rail 14a, and the rear rail. The perimeter of roof sheet 20 may be affixed to top side rails 12a, front rail 14a, and the real rail using any fastening means, including, but not limited to, rivets, screws, bolts, nails, pins or adhesive. Alternatively, roof sheet 20 may be welded, such as by radio-frequency welding, to top side rail 12a, front rail 14a, and the rear rail.

Turning to FIGS. 1-5, 7C and 8-11, roof sheet 20 is further supported by elongate support beams or bows 24 such that roof sheet 20 and bows 24 form a roof assembly. Bows 24 may be monolithic, i.e., unitary, and may include opposite ends 34, a top surface 26 and an opposing bottom surface 28. Bows 24 may be positioned on the exterior side (non-cargo side) of roof sheet 20. Ends 34 of bows 24 may be affixed to top side rails 12a of opposing sidewalls 12 by fasteners 36. Fasteners 36 may be any suitable fasteners including, but not limited to, rivets, screws, bolts, nails, pins or adhesive. Alternatively, ends 34 may be welded to top side rails 12a. Each bow 24 may define a central axis 31, an example of which is illustrated in FIG. 1.

As best illustrated in FIG. 8, each of bows 24 may include two outer contact portions 33, an inner contact portion 35, and two elongate ribs 37. Each of contact portions 33, 35 and ribs 37 may extend the full length of bow 24. Each rib 37 may include a horizontal base portion 38, a vertical inner wall 40 and an inclined outer wall 42 such that each of the two ribs 37 of a given bow 24 are mirror images of each other. Inner walls 40 may be oriented at angles of approximately 90 degrees relative to roof sheet 20. In the embodiment shown, outer walls 42 are oriented at angles of about 45 degrees relative to both the vertical direction and the horizontal direction. That is, outer walls 42 may be oriented at angles of about 45 degrees relative to their respective base portions 38 and to roof sheet 20. The slopes of outer walls 42 may enable obstructions to be lifted above bow 24 as trailer 10 moves in either of the forward and reverse directions indicated by double arrow 39. Further the slopes of outer wall 42 may decrease the aerodynamic drag of trailer 10. Ribs 37 may provide bow 24 with structural strength such that bow 24 is resistant to bending about its axis. Thus, ribs 37 may enable bow 24 to support the weight of roof sheet 20 with reduced levels of deformation or flexing of bow 24.

Base portion 38, vertical inner wall 40 and inclined outer wall 42 may conjointly define a bottom-facing channel 30. Disposed between and adjacent to channels 30 are elongate roof sheet contact points or surfaces 32. Each of walls 40, 42 may be directly attached to, and disposed adjacent to, one of contact surfaces 32. Contact surfaces 32 may be flat or planar. In one embodiment, contact surfaces 32 may be textured or corrugated for purposes of facilitating the use of adhesive or welding to fasten bow 24 to roof sheet 20. Alternatively, or additionally, two or all three of contact surfaces 32 may be co-planar.

In one embodiment, bow 24 has a width 44 of about five inches and a height 46 of about 0.425 inch. Base portion 38 may have a width of about one inch. A thickness 48 of bow 24 may be about 0.1 inch.

Bows 24 extend across roof sheet 20, and contact surfaces 32 of bottom surface 28 may be adhered or otherwise fastened to the exterior surface of root sheet 20, thereby supporting roof sheet 20 between sidewalls 12. Contact surfaces 32 of bows 24 may be adhered to roof sheet 20 by any suitable means including, but not limited to, adhesive, welding, rivets, screws, nails, bolts or pins. To prevent water, debris and other elements from entering the cargo area, adhesive or welding may be chosen, thereby avoiding puncturing roof sheet 20. Alternatively, other types of fasteners such as rivets, screws, nails, bolts or pins may be used accompanied by a sealant placed about the fasteners.

As illustrated in FIGS. 1-4 and 9-11, bows 24 may be arranged parallel to, and spaced apart from, one another. Bows 24 may be spaced apart by any distance suitable for supporting the weight of roof sheet 20. Such a distance may vary depending on the weight, thickness and composition of roof sheet 20. For instance, in one embodiment, bows 24 are spaced approximately between twelve and sixteen inches apart.

Bows 24 may be upwardly arched between sidewalls 12. For instance, in one particular embodiment, bows 24 are arched such that a mid-point along the length of each bow is about one inch above the two opposite ends of the bow. Top side rails 12a may be angled to facilitate the coupling of ends 34 of arched bows 24 to side rails 12a. That is, a top side rail 12a may be oriented in a position that is rotated about an axis (not shown) (defined by the top side rail 12a such that a top surface of top side rail 12a is substantially parallel to a corresponding end of an arched bow 24. Such a parallel relationship between a top surface of top side rail 12a and a corresponding end of a bow 24 is illustrated in FIG. 7C, for example.

Roof sheet 20 may be correspondingly arched to match the arch of bows 24. If sheet 20 is formed of a rigid material, then sheet 20 may be manufactured with an arched shape to match the arch of bows 24. Conversely, if sheet 20 is formed of a flexible material, then sheet may be fastened to bows to thereby provide sheet 20 with a correspondingly arched shape.

Because bows 24 are positioned on the exterior side of roof sheet 20, rather than in the interior cargo space, bows 24 do not act as an obstruction to the loading and unloading of cargo. The plurality of contact surfaces 32 of bows 24 aid in attaching blows 24 to roof sheet 20 and, ultimately, in supporting roof sheet 20.

Bows 24 may be formed of any rigid material suitable for supporting roof sheet 20 including, for example, aluminum, steel, metal alloys and plastic. However, it is also possible within the scope of the invention for bows 24 to be formed of a flexible material such that bows may flex into an arched shape when forces are exerted on opposite ends 34 of a bow 24.

Roof sheet 20 may be formed of any material capable of enclosing the roof of the trailer. For instance, roof sheet 20 may be made of fiberglass, plastic, wood, metal or other material. Roof sheet may be formed of a material that is flexible, semi-rigid, or rigid. It may be desirable to form roof sheet 20 and bows 24 of a lightweight material. Accordingly, in one particular embodiment, roof sheet is formed of Bulitex® available from U.S. Liner Company, 19 Leonberg Rd, Cranberry Township, Pa. 16066, and bows 24 are formed of aluminum.

Figure 12:
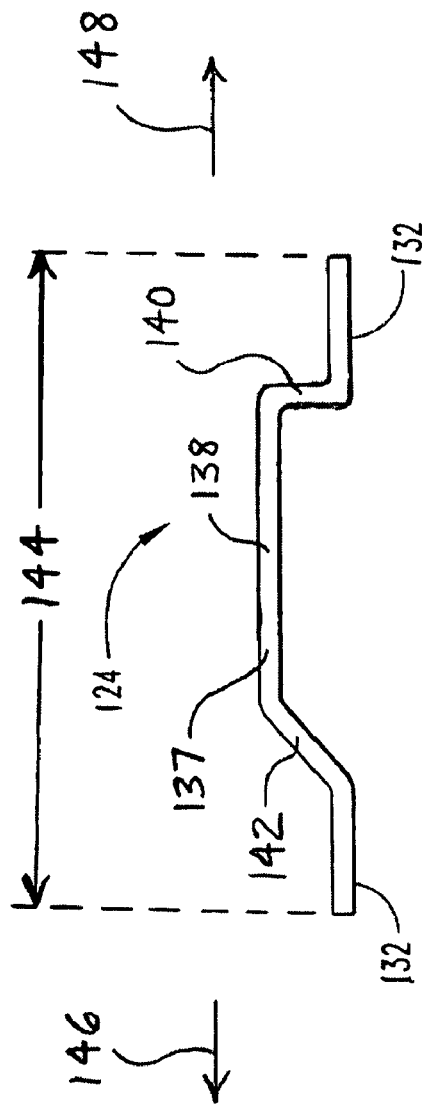
FIG. 12 is a sectional view of another embodiment of a roof bow of the present invention.

Roof bow 24 is shown herein as including two ribs 37 and three contact surfaces 32. However, in another embodiment, a roof bow 124 (FIG. 12) has a single rib 137 and two contact surfaces 132. Contact surfaces 132 may be flat and possibly co-planar. Roof bow 124 may have a width 144 of approximately between 2.5 and 3.0 inches. In one embodiment, adjacent roof bows 124 are spaced apart by a distance of approximately between nine and twelve inches. Rib 137 may have a leading wall 142 that is tapered, i.e., oriented at an angle of approximately between 30 degrees and 60 degrees relative to the roof sheet. In one embodiment, leading wall 142 is oriented at an angle of approximately 45 degrees relative to the roof sheet. Leading wall 142 may face generally in a forward direction of the truck, indicated by arrow 146, in which direction the truck normally travels when its transmission is in the "drive" position. This orientation of wall 142 may provide rib 137 with improved aerodynamic qualities and the ability to "lift" obstructions up the ramp that is provided by wall 142. A trailing wall 140 may face in a reverse direction of the truck, indicated by arrow 148, in which direction the truck normally travels when its transmission is in the "reverse" position. Trailing wall 140 may be oriented at a right angle of about 90 degrees relative to the roof sheet, to contact surfaces 132, and/or to a base portion 138. This right angle orientation of wall 140 may provide rib 137 with improved structural integrity and resistance to bending about the longitudinal axis of rib 137.

Figure 13:
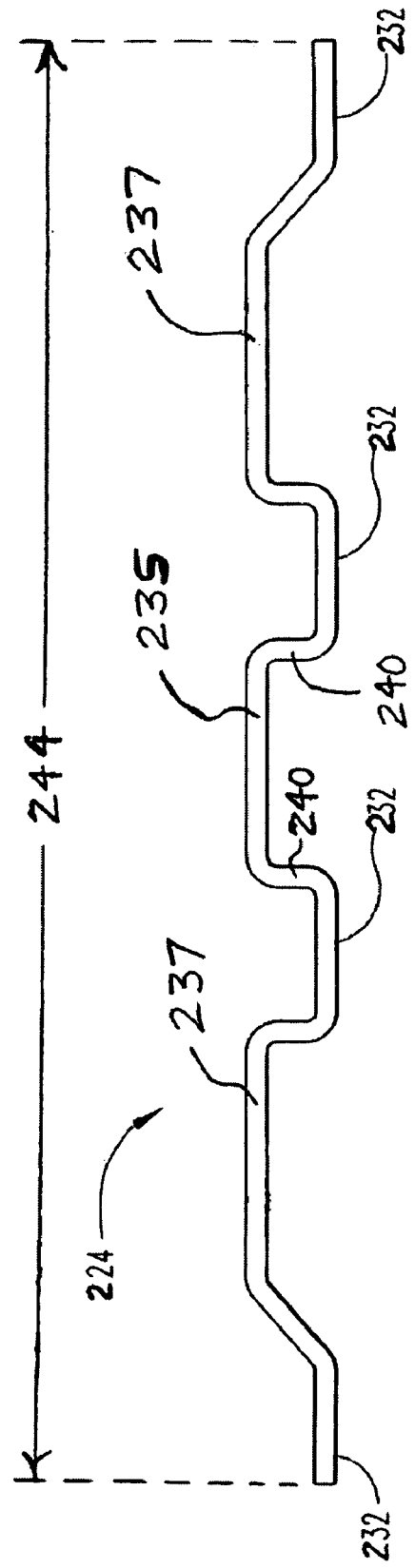
FIG. 13 is a sectional view of yet another embodiment of a roof bow of the present invention.

It is also possible within the scope of the invention for a roof bow to include more than two ribs and more than three contact surfaces. For example, in another embodiment illustrated in FIG. 13, a roof bow 224 has three ribs including two outer ribs 237 and a central rib 235 having two vertical walls 240. Roof bow 224 has four contact surfaces 232. Contact surfaces 232 may be flat and two, three, or all four of contact surfaces 232 may be co-planar. Roof bow 224 may have a width 244 of approximately between seven and eight inches. In one embodiment, adjacent roof bows 124 are spaced apart by a distance of approximately between sixteen and twenty-four inches.

Support beams 24, 124 and 224 are referred to herein as "bows". .However, it is to be understood that these bows are not necessarily curved or arc-shaped. Rather, the bows may be substantially linear.

Walls 40, 42 of bows 24, as well as the walls of bows 124 and 224, are described and illustrated herein as being oriented at specific angles. However, any of these walls may be oriented at angles of approximately between 30 and 90 degrees relative to roof sheet 20 within the scope of the invention.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A trailer comprising:
    a pair of substantially vertical, spaced apart opposing sidewalls;
    a roof sheet extending between and mounted atop said sidewalls, said sidewalls and roof sheet cooperating to define a cargo space, said roof sheet having an interior surface facing said cargo space and an opposing exterior surface; and
    a plurality of elongate support beams mounted to said exterior surface of said roof sheet and extending between said sidewalls, said plurality of beams supporting said roof sheet, each said beam including:
        at least three contact portions attached to said exterior surface of said roof sheet;
        a first rib portion interconnecting a first and a second of said contact portions and defining a first channel between the first rib portion and said exterior surface of said roof sheet; and
        a second rib portion interconnecting the second and a third of said contact portions and defining a second channel between the second rib portion and said exterior surface of said roof sheet.

2. The trailer of claim 1 further comprising a front wall and a rear wall, wherein said roof sheet extends between the front wall and the rear wall.

3. The trailer of claim 1 wherein said contact portions include contact surfaces facing and engaging said roof sheet, said contact surfaces being co-planar.

4. The trailer of claim 1 wherein said first rib portion includes at least one wall oriented at an angle of approximately between 75 and 90 degrees relative to said roof sheet.

5. The trailer of claim 1 wherein the first and the third of said contact portions are disposed on opposite sides of an axis defined by said beam.

6. A trailer comprising:
    a pair of spaced apart sidewalls;
    a roof sheet extending between and mounted to said sidewalls, said sidewalls and roof sheet cooperating to define a cargo space, said roof sheet having an interior surface facing said cargo space and an opposing exterior surface; and
    a plurality of elongate support beams mounted to said exterior surface of said roof sheet and extending between said sidewalls, said plurality of beams supporting said roof sheet, each said beam including:

first and second outer contact portions attached to said exterior surface of said roof sheet, said first and second outer contact portions being disposed on opposite sides of an axis defined by said beam;

a first rib portion having a first outer wall attached to said first outer contact portion, said first outer wall being oriented at an angle of approximately between 30 and 60 degrees relative to said roof sheet, said first rib portion having a first inner wall connected to said first outer wall, said first inner wall being oriented at an angle of approximately between 60 and 90 degrees relative to said roof sheet;

a second rib portion having a second outer wall attached to said second outer contact portion, said second outer wall being oriented at an angle of approximately between 30 and 60 degrees relative to said roof sheet, said second rib portion having a second inner wall connected to said second outer wall, said second inner wall being oriented at an angle of approximately between 60 and 90 degrees relative to said roof sheet; and a central contact portion attached to said exterior surface of said roof sheet, said central contact portion disposed between said first inner wall and said second inner wall, at least two of said first and second outer contact portions and said central contact portion having contact surfaces that face said roof sheet and that are substantially co-planar.

7. The trailer of claim 6 wherein said first and second outer contact portions and said central contact portion have contact surfaces that face said roof sheet and that are substantially co-planar, wherein said first and second rib portions are disposed entirely above the roof sheet.

8. The trailer of claim 6 wherein said central contact portion comprises a first central contact portion directly attached to said first inner wall, each said beam further including:

a second central contact portion directly attached to said second inner wall; and a third rib portion disposed between said first central contact portion and said second central contact portion, said third rib portion having third and fourth parallel walls each oriented at an angle of approximately 90 degrees relative to said roof sheet.

9. The trailer of claim 6 wherein said first rib portion includes a first base portion interconnecting and directly attached to said first outer wall and said first inner wall, said second rib portion including a second base portion interconnecting and directly attached to said second outer wall and said second inner wall, wherein said first and second base portions are oriented substantially parallel to said roof sheet.

10. The trailer of claim 9 wherein said first and second contact portions and said central contact portion all extend continuously between said sidewalls, said first outer wall being substantially linear and directly attached to said first outer contact portion, said second outer wall being substantially linear and directly attached to said second outer contact portion.

11. The trailer of claim 6 further comprising a front wall and a rear wall, wherein said roof sheet extends from the front wall to the rear wall.

12. The trailer of claim 6 wherein each said support beam is monolithic.

* * * * *